Feb. 3, 1970     F. W. HAUSER     3,492,906

SHANK STRENGTH FASTENER

Filed Sept. 9, 1968

INVENTOR.
FRANK W. HAUSER
BY
Elliott & Pastoriga
ATTORNEYS

United States Patent Office 3,492,906
Patented Feb. 3, 1970

3,492,906
SHANK STRENGTH FASTENER
Frank W. Hauser, Santa Monica, Calif., assignor to Avia Instrument, Lafayette, Calif., a company
Filed Sept. 9, 1968, Ser. No. 758,208
Int. Cl. F16b 35/00, 23/00, 37/00
U.S. Cl. 85—1                                    3 Claims

ABSTRACT OF THE DISCLOSURE

A high tensile strength threaded fastener has a threaded section located between a shank and tip. The threaded section has spiral roots that define a cone tapering toward the fastener tip. The root depths of the spiral roots associated with the dead-end threads near the shank are relatively shallow so that the resulting cross sectional area is substantially equal to that of the shank. As a result, greater stress concentrations can be withstood by the fastener without metal failure.

---

The present invention relates to connectors and more specifically to high tensile strength threaded fasteners constructed to withstand greater stress concentrations near the junction of the fastener threaded section and adjacent shank.

Background of the invention

High tensile strength threaded fasteners for use in the aircraft and missile industries for example, must be reliable and satisfy exacting durability standards. Conventional high strength threaded fasteners are frequently prone to fatigue and fracture from repetitive loads and impacts. One reason for the unacceptable failure rates of these conventional fasteners stems from the enormous stress concentration in the vicinity of the junction where the fastener threaded section joins the fastener shank. When a mating nut is torqued onto the fastener threaded section, the most fully engaged dead-end threads constitute the weakest link in the fastener. These threads become vulnerable to failure by necking down due to excess tension and rupture due to excess shear stress.

The source of weakness is created in part because the thread depth near the shank and threaded section junction is excessively deep and this construction shrinks the cross sectional area of the thread roots below a minimal critical area necessary to withstand and absorb applied tension.

It would be desirable to enlarge the root cross sectional area at this junction and yet provide sufficient bearing area for interengagement by the fastener threaded section and mating nut.

Brief description of the drawings

The numerous benefits and unique aspects of the present invention will be fully understood when the following detailed description is studied in conjunction with the drawings in which.

Brief summary of the invention

Briefly described, the present invention comprehends a high tensile strength threaded fastener constructed to withstand more stress and fatigue than conventional threaded fasteners of similar size and general shape. The fastener includes head, shank, tip, and screw thread sections, the screw thread section being arranged between the shank and tip. The present invention seeks to minimize the risk of failure in the ordinarily failure prone region of the screw thread section adjacent the shank. The root depth of the spiral roots in this dead-end thread section is made shallower than the root depth of the spiral roots near the fastener tip. As a result, the cross sectional area through the dead-end spiral root closest to the shank is substantially equivalent to the cross sectional area of the shank.

In accordance with one construction, the screw threads include a first abutment surface facing the tip and a second abutment surface facing the shank, the abutment surfaces being joined to define crests. The first abutment surface slope becomes gradually shallower in a direction from the tip to the shank so that the portion nearest the shank substantially coincides with a cone defined by the spiral roots.

In accordance with another construction, the spiral roots are flat and their widths increase while their root depths diminish in a direction from the tip of the shank.

The threads of the screw thread section may be interengaged by a nut or a wire insert having external threads engaged by a nut. When the nut or insert and nut combination is torqued onto the screw thread section of the fastener, greater stress concentration may be exerted in the dead-end spiral root zone without impairing or destroying the fastener.

Detailed description of the preferred embodiments

Figure 1:
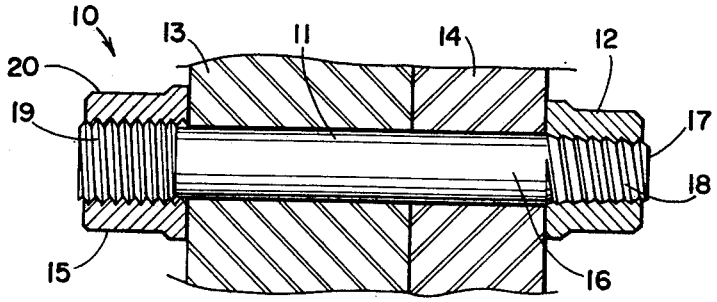
FIGURE 1 is a partially sectional view, showing a threaded fastener constructed in accordance with a first embodiment of the present invention positioned to hold a pair of plates together.

Referring first to FIGURE 1, a fastener assembly 10 is illustrated that incorporates a high tensile strength fastener 11 and a connector 12 which, in this embodiment, is in the form of a nut. Fastener 11 and connector 12 are shown torqued together in order to tightly secure a relatively thick plate 13 and a relatively narrow plate 14 against one another. Plates 13 and 14 may, for example, be components of an aircraft structure.

High tensile strength fastener 11 includes a head 15, a shank 16 connected to head 15, and, a tip 17. A screw thread section 18 is formed between shank 16 and tip 17. Head 15, in this embodiment, includes an enlarged threaded portion 19 whose threads interengage with those of a conventional threaded cap 20.

Figure 2:
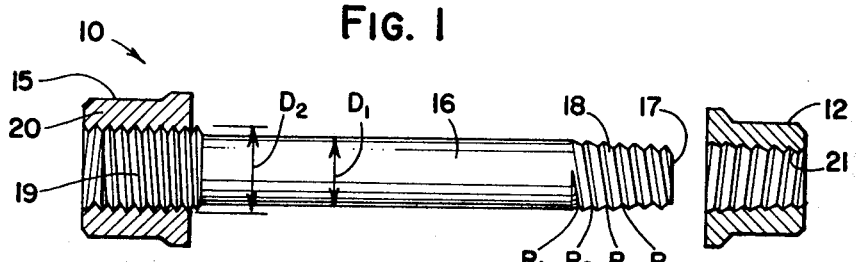
FIGURE 2 is a partially exploded view, showing important details of the threaded fastener illustrated in FIGURE 1.

FIGURE 2 shows that the diameter $D_1$ of shank 16 is smaller than the outside diameter $D_2$ of enlarged threaded portion 19. Enlarged threaded portion 19 is fabricated so that the minor or root diameter is equal to or larger than shank diameter $D_1$. Connector 12 is formed with internal threads 21 shaped to tightly interengage the threads of threaded section 18. As shall be fully described, the particular shape and function of thread roots $R_1$, $R_2$, $R_3$, $R_4$ and so forth between shank 16 and tip 17 operate to strengthen screw thread section 18 to a degree not achieved in related conventional threaded fasteners.

Figure 3:
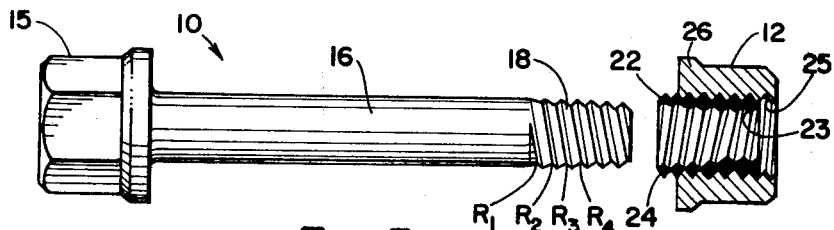
FIGURE 3 is a partially sectional and exploded view of a threaded fastener constructed in accordance with a second embodiment of the present invention.

FIGURE 3 shows another embodiment of fastener assembly 10 wherein head 15 is solid and integrally formed with shank 16. Connector 12 incorporates a wire insert 22 having internal threads 23 shaped to interengage with the threads of threaded section 18. Wire insert 22 also has external threads 24 shaped to interengage with the complementary threads 25 of a torque nut 26. Wire insert 22 is a precision-formed spiral coil whose external threads 24 are of conventional configuration but whose internal threads 23 are specially shaped in a manner similar to the internal threads 21 of the nut shown in FIGURE 2.

Figures 4, 5:
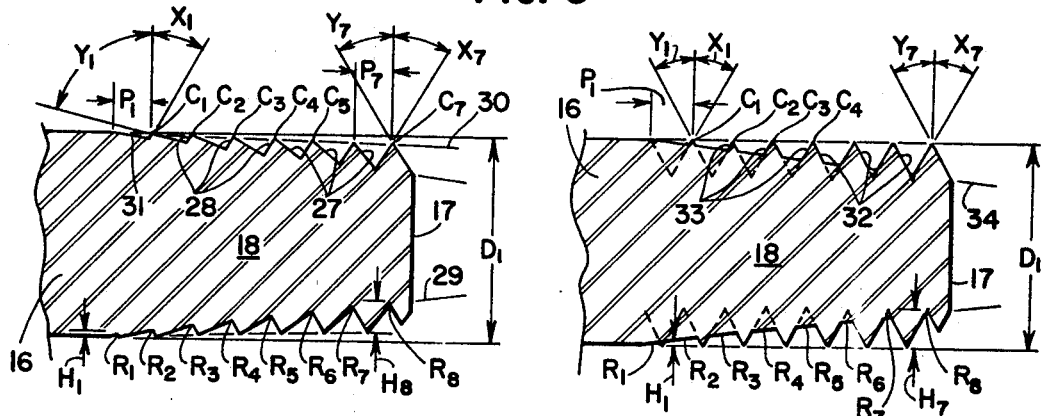
FIGURE 4 is an enlarged detailed view showing a specific configuration of the threaded sections of the fasteners illustrated in FIGURE 2 and FIGURE 3; and, FIGURE 5 is an enlarged detailed view of an alternative configuration for the threaded sections of the fasteners illustrated in FIGURE 2 and FIGURE 3.

FIGURE 4 is an enlarged detailed illustration of the threaded section 18 illustrated in the fastener embodiments of FIGURE 2 and FIGURE 3. Threaded section 18 is formed with a first abutment surface 27 facing a direction towards tip 17. A second abutment surface 28 merges with first abutment surface 27 and faces in a direction towards shank 16. A surface passing through the consecutive individual spiral roots $R_1$, $R_2$, $R_3$ and so forth of root section 18 constitutes an imaginary cone 29. The base of cone 29 intersects the adjacent end of shank 16. The abutment surfaces 27 and 28 converge and form thread crests $C_1$, $C_2$, $C_3$, and so forth. A surface passing through consecutive spiral crest segments constitutes another cone 30.

The general angular orientation between the second abutment surface 28 remains substantially constant between tip 17 and shank 16. Thus angle $X_7$ is substantially equivalent with angle $X_1$. However the angular orientation between the first abutment surface 27 and the fastener axis constantly changes and becomes shallower between tip 17 and shank 16. As the angle between abutment surface 27 and a plane perpendicular to the fastener axis increases between tip 17 and shank 16 as represented by the angle increase between $Y_7$ and $Y_1$, it can be seen that the slope of surface 27 becomes gradually shallower. The dead-end spiral segment 31 of abutment surface 27 closest to shank 16 is characterized by a slope that substantially coincides with cone 29. As abutment surface 27 becomes shallower in a direction from tip 17 to shank 16, the root depth gradually diminishes as represented by the difference between depth $H_8$ and $H_1$. Thus the root depths of the dead-end threads closest to shank 16 are relatively shallow. The pitch between consecutive crests may remain constant so that $P_7$ equals $P_1$.

By this arrangement the customary failure zone of conventional threaded fasteners, i.e., the thread roots of the dead-end threads nearest the shank, is considerably strengthened. Thus the cross sectional area through screw thread spiral root $R_1$, i.e., the spiral root closest to the intersection line between shank 16 and cone 29, is substantially equivalent to the cross sectional area of shank 16. As a result, this otherwise failure prone zone is capable of withstanding greater stress concentrations than conventional threaded fasteners can withstand.

FIGURE 5 illustrates another configuration of threaded section 18 enabling the fastener to be employed in higher stress concentration ranges. In this embodiment, the first abutment surface 33 and the second abutment surface 34 maintain a constant angular orientation relative to the fastener axis from tip 17 to shank 16. This is evident by the fact that angle $X_1$ equals angle $X_7$ and angle $Y_1$ equals angle $Y_7$. It can be seen that the individual spiral roots $R_1$, $R_2$, $R_3$ and so forth define an imaginary cone 34.

Rather than being sharp grooves as in the case of embodiment illustrated in FIGURE 4, the individual spiral roots are flat as viewed in a lateral direction. It can be seen that consecutive spiral roots become wider and shallower in a direction from tip 17 to shank 16. The most inward or dead-end root $R_1$ slopes upwardly towards and merges with shank 16. By this arrangement, combined surface areas of abutment surfaces 32 and 33 provide sufficient bearing or gripping surface and yet the cross sectional area in the vicinity of root $R_1$ is substantially identical with the cross-sectional areas of shank 16.

When the threaded fasteners of the above-described embodiments are sufficiently torqued with mating connectors it can be seen that many of the previously described weaknesses of prior art threaded fasteners are overcome or substantially eliminated. It is evident that the present invention has provided a shank strength fastener in which all of the various advantages are fully realized.

What is claimed is:
1. A shank strength fastener comprising:
  (a) a head;
  (b) a shank connected to the head;
  (c) a tip;
  (d) a screw thread section between the shank and tip, the threads of the screw thread section being oriented so that their spiral roots define a cone whose base intersects the shank, and, the cross sectional area through the dead-end spiral root closest to the intersection line is substantially equivalent to the cross sectional area of the shank;
  (e) a first abutment surface of the screw thread section facing the tip;
  (f) a second abutment surface of the screw thread section facing the shank and joined with the first abutment surface to define crests, the first abutment surface slope becoming gradually shallower in a direction from the tip to the shank so that its portion nearest the shank substantially coincides with said cone,
wherein upon being torqued failure by the interengaged, dead-end threads due to stress concentration is substantially minimized.

2. The structure according to claim 1, wherein the diameters of the screw threads crest gradually enlarge in a direction from the tip to the shank.

3. A high tensile strength fastener for holding together two or more plates, comprising:
  (a) a head;
  (b) a shank connected to the head;
  (c) a tip;
  (d) a screw thread section between the shank and tip, the threads of the screw thread section being oriented so that their spiral roots define a cone whose base intersects the shank, and, the cross sectional area through the dead-end spiral root closest to the intersection line is substantially equivalent to the cross sectional area of the shank;
  (e) a first abutment surface of the screw thread section facing the tip;
  (f) a second abutment surface of the screw thread section facing the shank and joined with the first abutment surface to define crests; wherein, the first abutment surface slope becomes gradually shallower in a direction from the tip to shank so that its portion nearest the shank coincides with said cone, and, the diameters of the screw thread crests gradually enlarge from the tip to the shank;
  (g) a connector having internal threads of complementary configuration relative to the threads of the screw thread section, wherein when the connector and screw thread section are torqued together thread failure in the screw thread section due to stress concentration is substantially minimized.

References Cited

UNITED STATES PATENTS

| | | | |
|---|---|---|---|
| 806,407 | 12/1905 | Farrington | 85—64 |
| 1,869,322 | 7/1932 | Bush. | |
| 2,245,419 | 6/1941 | Unke | 285—390 |
| 2,267,923 | 12/1941 | Johnson | 85—46 X |
| 3,316,795 | 5/1967 | Tann | 85—46 X |

FOREIGN PATENTS

| | | |
|---|---|---|
| 750,894 | 6/1956 | Great Britain. |
| 321,629 | 6/1957 | Switzerland. |

RAMON S. BRITTS, Primary Examiner

U.S. Cl. X.R.

85—9, 32, 46